United States Patent
Coulson et al.

(10) Patent No.: US 10,550,783 B2
(45) Date of Patent: Feb. 4, 2020

(54) METHOD AND SYSTEM FOR ENGINE COLD-START

(71) Applicant: Ford Global Technologies, LLC, Dearborn, MI (US)

(72) Inventors: Gary Alan Coulson, Ypsilanti, MI (US); Steven Wooldridge, Manchester, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 152 days.

(21) Appl. No.: 15/462,545

(22) Filed: Mar. 17, 2017

(65) Prior Publication Data
US 2018/0266350 A1 Sep. 20, 2018

(51) Int. Cl.
| | |
|---|---|
| *F02D 41/06* | (2006.01) |
| *F02D 41/40* | (2006.01) |
| *F02P 5/04* | (2006.01) |
| *F02N 11/08* | (2006.01) |

(52) U.S. Cl.
CPC ......... *F02D 41/064* (2013.01); *F02D 41/065* (2013.01); *F02D 41/401* (2013.01); *F02P 5/045* (2013.01); *F02D 2200/0414* (2013.01); *F02D 2200/0611* (2013.01); *F02N 11/08* (2013.01); *F02N 2200/041* (2013.01)

(58) Field of Classification Search
CPC .... F02D 41/064; F02D 41/065; F02D 41/401; F02D 2200/0611; F02D 2200/0414; F02D 2009/0225; F02D 19/0655; F02D 19/084; F02P 5/045; F02N 11/08; F02N 2200/041
USPC ........................................................ 123/406
See application file for complete search history.

(56) References Cited

U.S. PATENT DOCUMENTS

| | | | |
|---|---|---|---|
| 5,146,882 A * | 9/1992 | Brinkman | F02D 41/062 123/1 A |
| 6,653,807 B2 | 11/2003 | Saito et al. | |
| 7,007,462 B2 | 3/2006 | Kitahara | |
| 9,346,451 B2 | 5/2016 | Ulrey et al. | |
| 2011/0088661 A1* | 4/2011 | Sczomak | F02D 13/06 123/481 |
| 2013/0296126 A1 | 11/2013 | Gibson et al. | |

(Continued)

FOREIGN PATENT DOCUMENTS

| | | | |
|---|---|---|---|
| JP | 2008232007 A | 10/2008 | |
| JP | 2009002314 A | 1/2009 | |

OTHER PUBLICATIONS

Coulson, Gary Alan, et al., "Method and System for Engine Cold-Start," U.S. Appl. No. 15/462,622, filed Mar. 17, 2017, 68 pages.

*Primary Examiner* — Joseph J Dallo
*Assistant Examiner* — Scott A Reinbold
(74) *Attorney, Agent, or Firm* — Geoffrey Braumbaugh McCoy Russell LLP

(57) ABSTRACT

Methods and systems are provided for adjusting engine cranking speed, fueling, and spark initiation to increase fuel vaporization during cold-start conditions. In one example, a method may include, during engine cold-start, cranking the engine at a lower speed relative to a nominal cranking speed while injecting fuel and disabling spark for a number of engine cycles, and after the completion of the number of engine cycle increasing the cranking speed and initiating spark.

20 Claims, 6 Drawing Sheets

(56) References Cited

U.S. PATENT DOCUMENTS

| | | | |
|---|---|---|---|
| 2014/0297159 A1* | 10/2014 | Surnilla | F02D 41/3094 |
| | | | 701/103 |
| 2015/0204264 A1* | 7/2015 | Gibson | F02M 61/145 |
| | | | 123/491 |
| 2016/0069280 A1* | 3/2016 | Yasuda | F02D 41/064 |
| | | | 701/104 |
| 2017/0037803 A1 | 2/2017 | Surnilla et al. | |
| 2017/0226953 A1* | 8/2017 | Yamasaki | F02D 41/3076 |

* cited by examiner

METHOD AND SYSTEM FOR ENGINE COLD-START

FIELD

The present description relates generally to methods and systems for cranking an engine during a cold-start condition.

BACKGROUND/SUMMARY

Alternate fuels have been developed to mitigate the rising prices of conventional fuels, to reduce dependence on imported fuels, and for reducing production of pollutants, such as $CO_2$. For example, alcohol and alcohol-based fuel blends have been recognized as attractive alternative fuels, in particular for automotive applications. However, alcohol and alcohol-based fuels are less volatile than diesel, and as such may not evaporate effectively during engine cranking at cold-start conditions. Incomplete vaporization of the alcohol and alcohol-based fuels may reduce fuel economy and degrade emissions.

Various approaches are provided for increasing fuel vaporization during cold-start. In one example, as shown by Samejima in JP 2009002314A, an engine cranking speed is adjusted. In particular, a higher engine cranking speed is applied when the alcohol concentration of the injected fuel is high and the ambient temperature is low. In another example approach shown by Kuroki in JP 2008232007, a starter motor speed is increased when there is an issue with fuel vaporization. In a further example, Ulrey et al. in U.S. Pat. No. 9,346,451 disclose a method of cranking the engine unfueled at a lower than normal speed such that the heat generated in the compression stroke of a cylinder may be transferred to cylinder walls, thereby expediting engine warm-up.

However, the inventors herein have recognized potential issues with such approaches. In the approaches shown by Samejima and Kuroki, the starter speed is increased to rapidly reduce the intake manifold pressure since the lower pressure assists in fuel vaporization. However, the rapid reduction in manifold pressure via the increasing of the starter speed also reduces the time available for vaporizing the fuel. Consequently, it may be difficult to optimize the starter speed for both the manifold pressure and the fuel alcohol content. Also, increased cranking speed during engine start may result in engine flares. An optimal amount of vaporized fuel may be desired to maintain combustion stability. Incomplete fuel vaporization may further lead to cylinder misfiring events. In the approach shown by Ulrey et al., since the engine is cranked unfueled at a lower cranking speed, once fueling is initiated, fuel blends with a higher alcohol content may not get sufficient time for vaporization before combustion is initiated.

In one example, the issues described above may be addressed by an engine method comprising: for a number of engine cycles since a first engine cycle of an engine cold-start, cranking the engine via a starter motor with cranking speed decreased relative to a nominal cranking speed while injecting fuel and disabling spark; and after the number of engine cycles with injected fuel compressed and expanded, increasing the cranking speed to the nominal cranking speed and initiating spark. In this way, by cranking the engine via a starter motor at a lower cranking speed while fueling the engine without spark until a number of engine cycles are completed, sufficient time may be provided to vaporize the fuel and provide a homogeneous air-fuel mixture. By raising the cranking speed and resuming spark after the number of engine cycles have elapsed, the intake manifold pressure may be lowered and cylinder combustion can be performed with a higher degree of fuel vaporized before combustion is initiated.

As one example, during cold-start conditions, a starter motor may be actuated to crank the engine. The cranking speed may be lowered relative to a nominal cranking speed while fuel is injected into the engine with spark disabled for a number of engine cycles. The number of engine cycles and the cranking speed may be selected based on the alcohol content of the injected fuel and the ambient temperature so as to enable a larger portion of the fuel to be vaporized by the time spark is enabled. As an example, the cranking speed may be lowered to 150 rpm, and the engine may be fueled with no spark for two complete engine cycles (e.g., the first two engine cycles since engine start is initiated). On the subsequent engine cycle (e.g., the third engine cycle since the engine is started), the cranking speed may be raised, for example to 250 rpm, and spark may be resumed. To further improve fuel vaporization, fuel injection timing may be adjusted to extend up till the spark event. For example, an end of fuel injection timing may be shifted from bottom dead center (BDC) of the intake stroke to top dead center (TDC) of compression stroke.

In this way, by lowering cranking speed to below the nominal speed, a larger time window is provided for fuel vaporization. Also, by using a lower engine cranking speed, engine speed flares may be reduced. By continuing fuel injection until spark, a higher amount of fuel may be injected which may result in an increase in the amount of vaporized fuel available for combustion. The technical effect of deactivating spark until a defined number of fueled engine cranking cycles have elapsed is that each cylinder may be conditioned with vaporized fuel and upon activating spark after accumulation of an optimal amount of pre-vaporized fuel, combustion stability may be improved. By improving combustion stability, misfire event occurrence and unburned hydrocarbon emissions during engine starts may be reduced. By increasing the cranking speed after the number of engine cycles have elapsed, the desired intake manifold pressure may be attained, facilitating combustion. By adjusting the cranking speed, fuel injection profile, and the number of non-firing cycles based on the alcohol content of the fuel, vaporization of any variety of alcohol fuel may be optimized. Overall, by increasing the degree of fuel alcohol vaporization, engine performance, fuel economy, and emissions quality may be increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
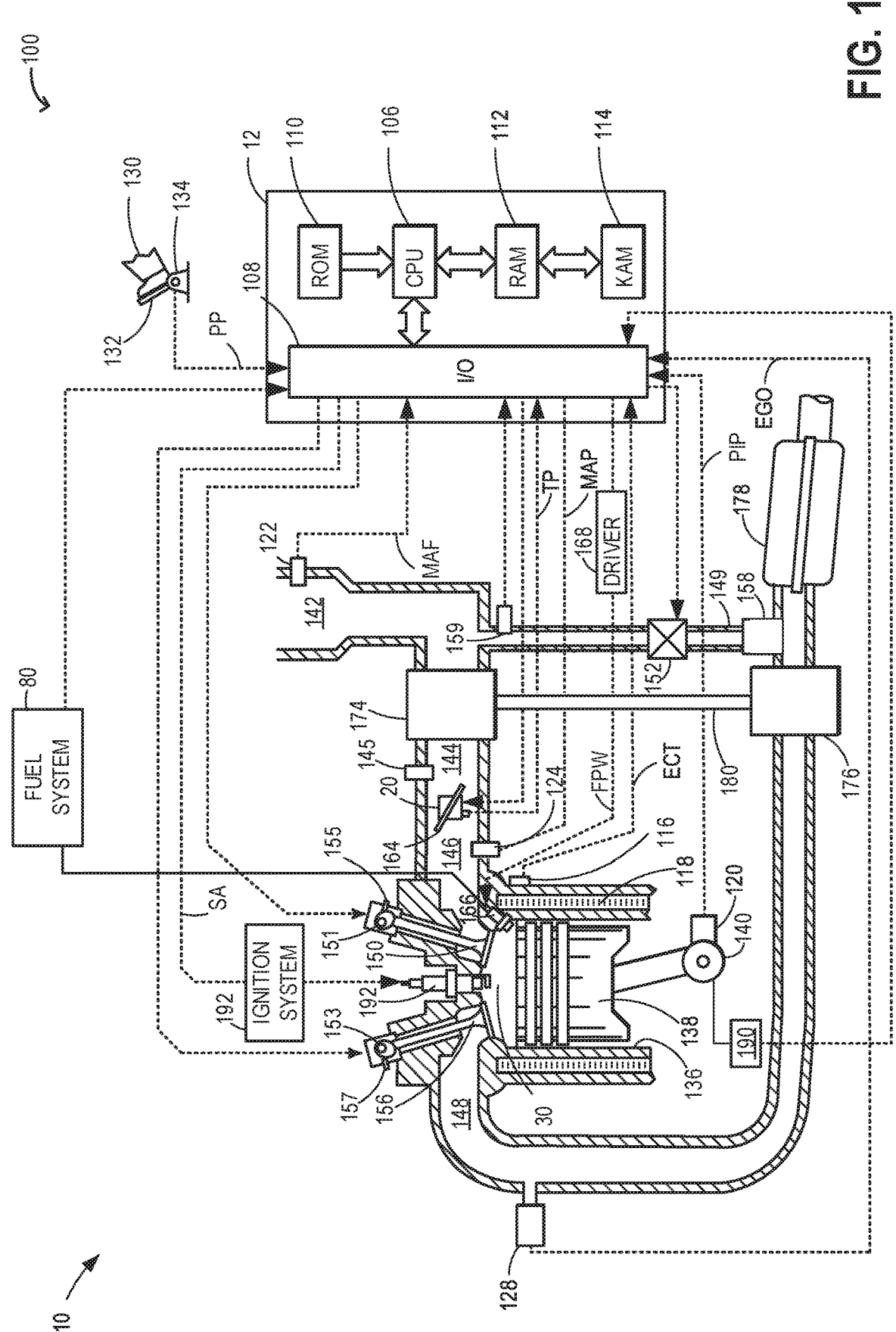
FIG. 1 shows an example embodiment of an engine system including a starter motor.
Figure 3:
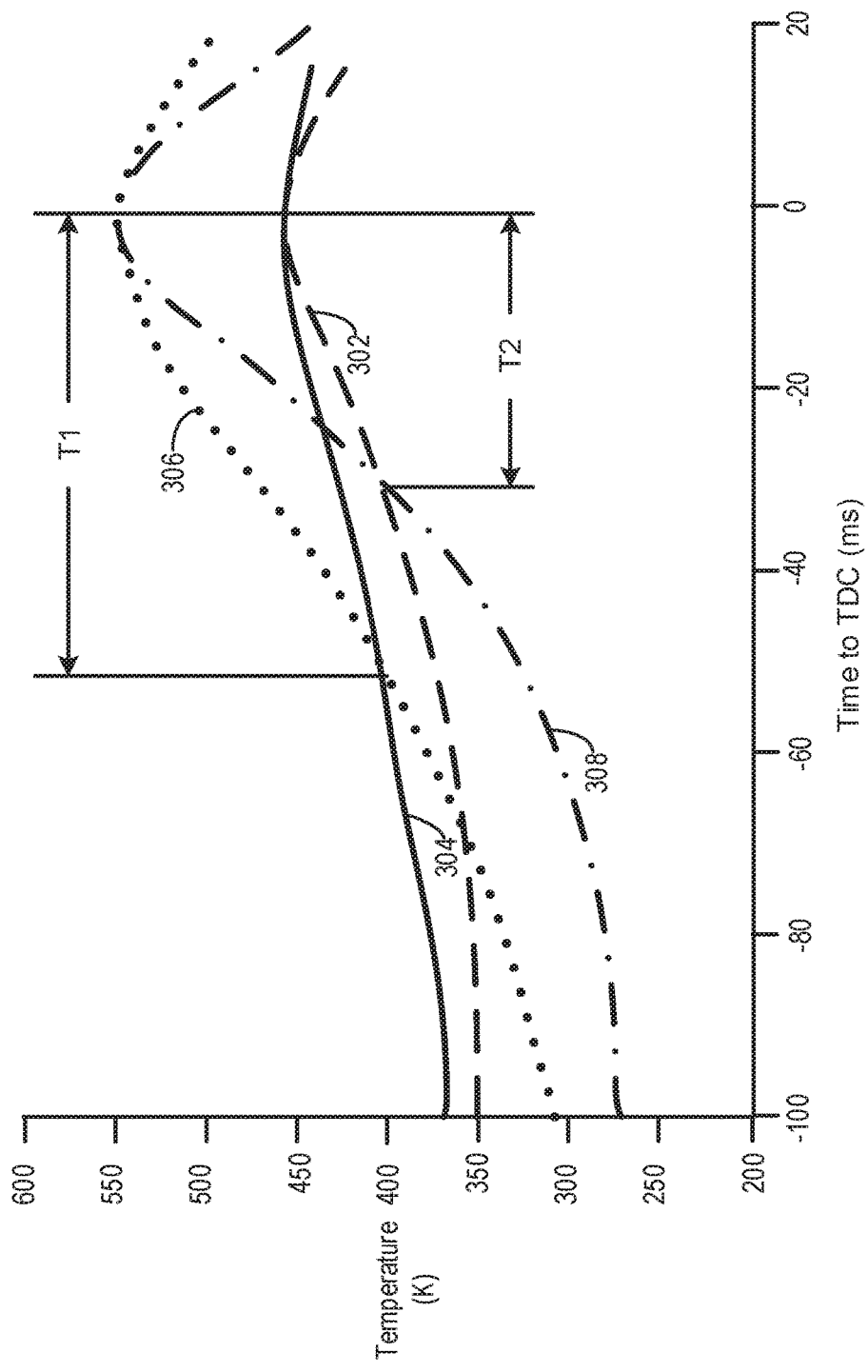
FIG. 3 shows an example change in air charge temperature and fuel boiling point with change in cranking speed.
Figure 4:
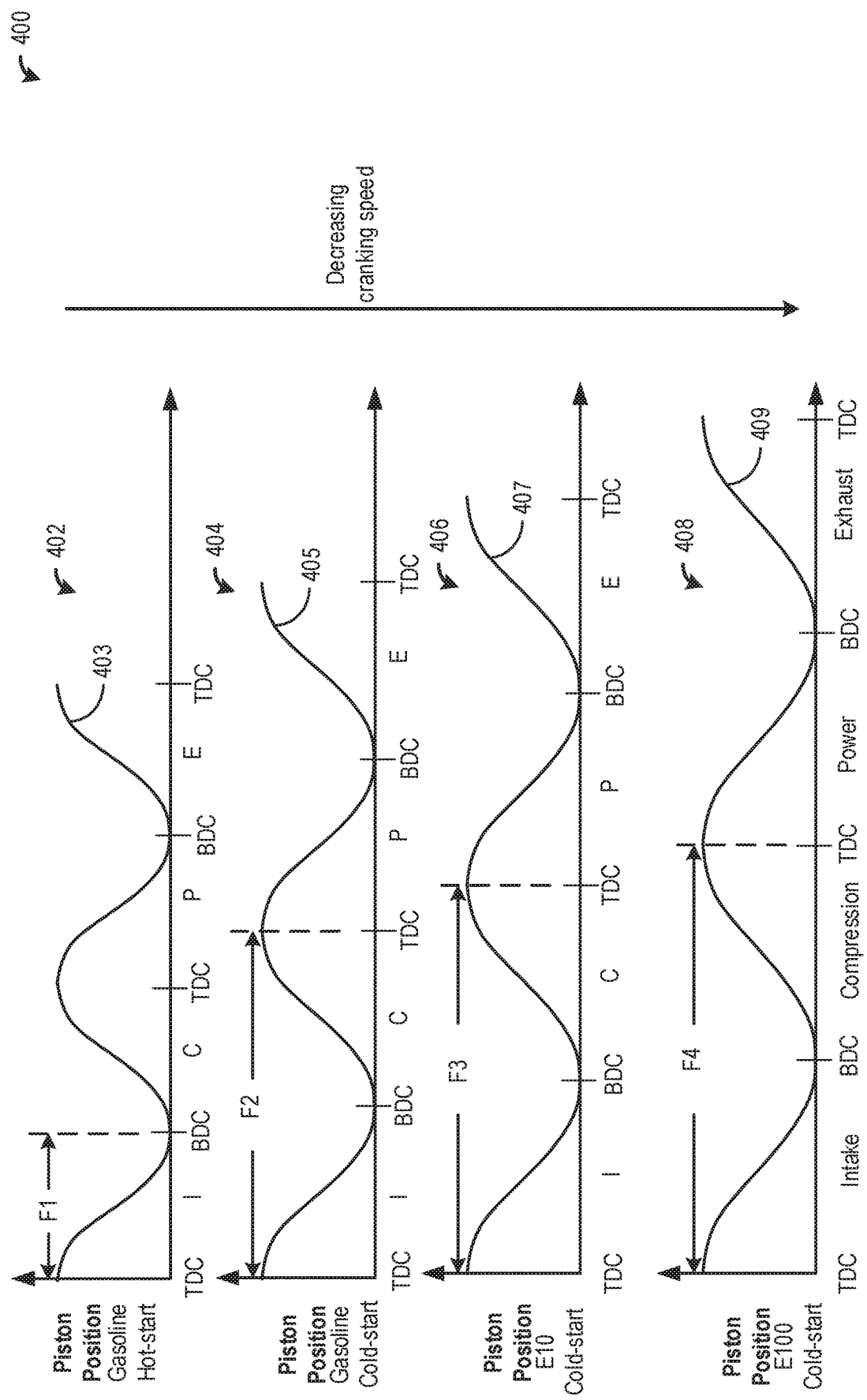
FIG. 4 shows an example map of piston positions with respect to an engine position, for a given engine cylinder, during cranking.
Figure 5:
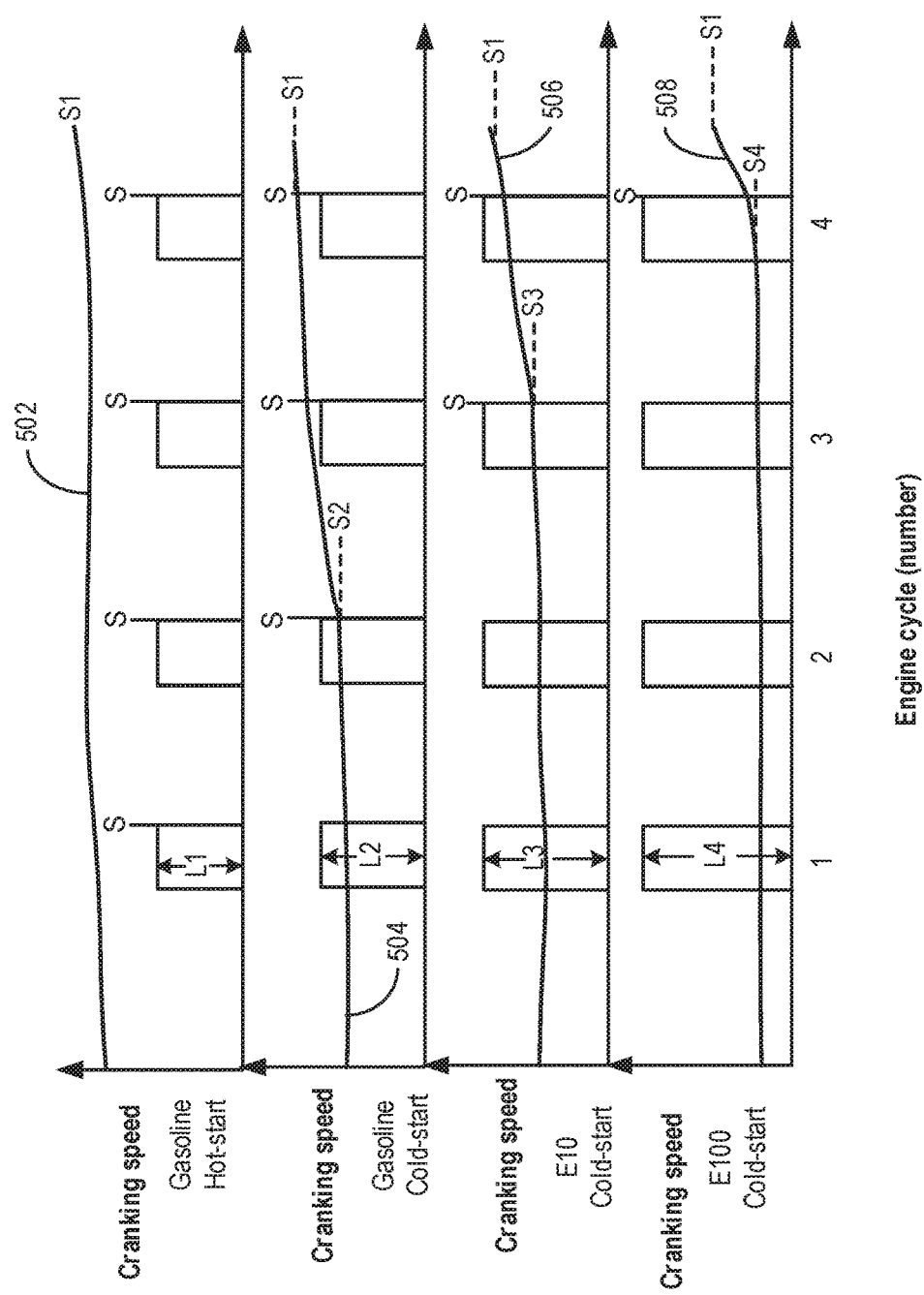
FIG. 5 shows an example map of injection timing, spark timing, and cranking speed for a given engine cylinder, during cranking.
Figure 6A:
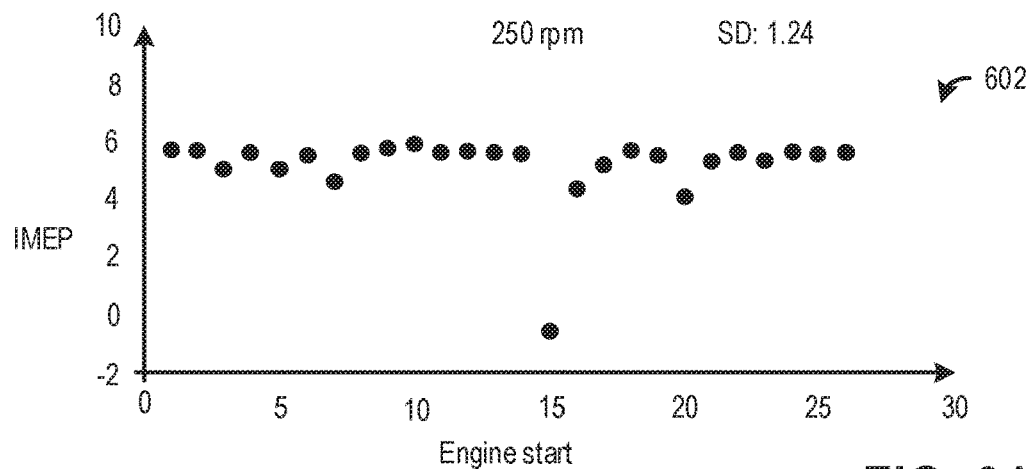
FIG. 6A shows a first statistical example of first firing event combustion stability at a first cranking speed.
Figure 6B:
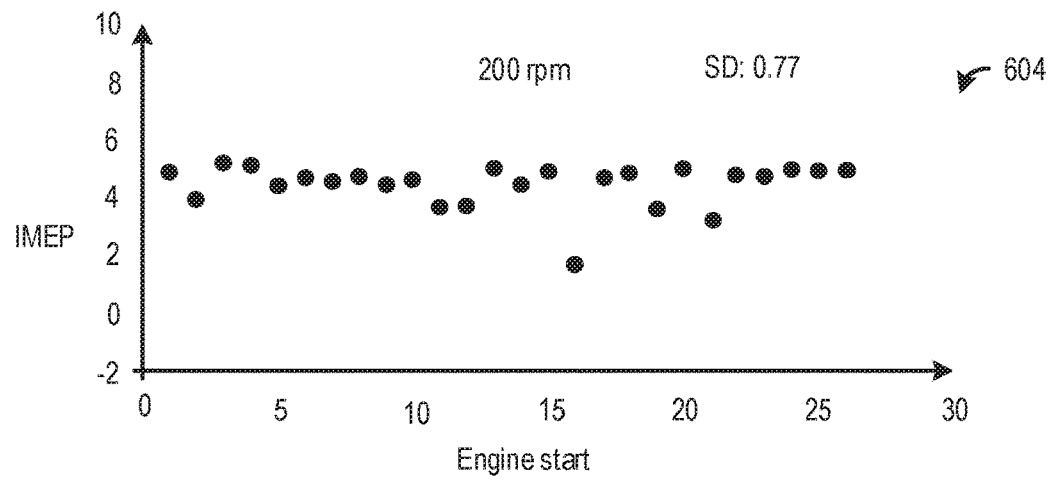
FIG. 6B shows a second statistical example of first firing event combustion stability at a second cranking speed.
Figure 6C:
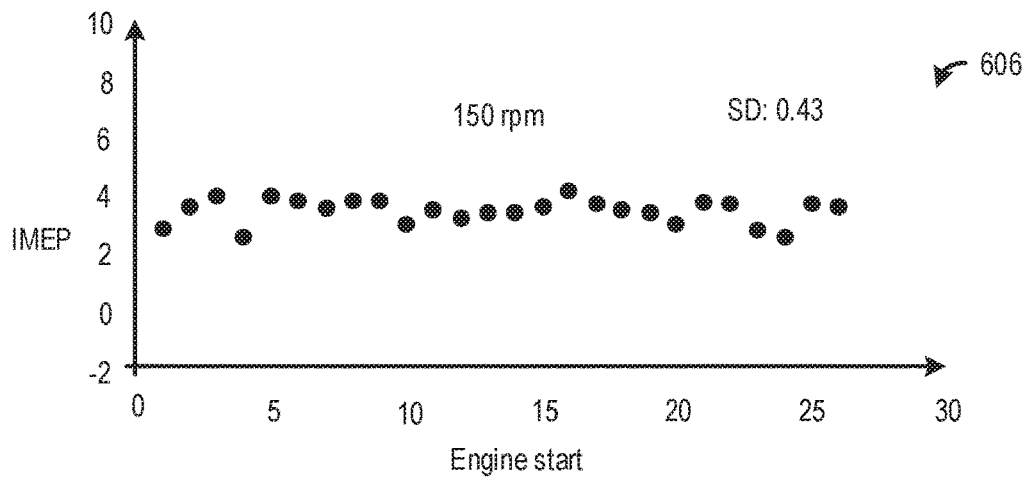
FIG. 6C shows a third statistical example of first firing event combustion stability at a third cranking speed.

The following description relates to systems and methods for increasing fuel vaporization during engine cranking under cold-start condition. An example embodiment of an engine system comprising a starter motor, an ignition system, and a fuel system is shown at FIG. 1. An engine controller may be configured to perform control routines, such as the example routine of FIG. 2, to adjust cranking speed, fuel injection, and spark initiation to increase fuel vaporization during cold-start conditions. Changes in air charge temperature and fuel boiling point due to change in cranking speed under cold-start conditions is shown in FIG. 3. FIGS. 4 and 5 show adjustments to fueling schedule, spark timing, and cranking speed, during cold-start conditions. Adjustments to each of the fueling schedule, the spark timing, and the cranking speed may be based on the alcohol (e.g., ethanol) content of the fuel to improve combustion stability and reduce occurrence of engine start misfires. FIGS. 6A-6C show statistical examples of first firing event combustion stability and misfire occurrence at different cranking speeds.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Combustion chamber (i.e. cylinder) 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of a vehicle via an intermediate transmission system. Further, a starter motor 190 may be coupled to crankshaft 140 via a flywheel to enable a starting operation (cranking) of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 30. In one example, exhaust passage 148 may receive exhaust from all the cylinders of engine 10. However, in some embodiments, as elaborated at FIG. 2, the exhaust from one or more cylinders may be routed to a first exhaust passage, while the exhaust from one or more other (remaining) cylinders may be routed to a second, different exhaust passage, the distinct exhaust passages then converging further downstream, at or beyond an exhaust emission control device. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Engine 10 may further include an exhaust gas recirculation (EGR) system to route a portion of exhaust gas from exhaust passage 148 to intake manifold 144. FIG. 1 shows a low pressure EGR (LP-EGR) system, but an alternative embodiment may include only a high pressure EGR (HP-EGR) system, or a combination of both LP-EGR and HP-EGR systems. The LP-EGR is routed through LP-EGR passage 149 from downstream of turbine 176 to upstream of compressor 174. The amount of LP-EGR provided to intake manifold 144 may be varied by controller 12 via LP-EGR valve 152. The LP-EGR system may include LP-EGR cooler 158 to reject heat from the EGR gases to engine coolant, for example. For example, one or more sensors 159 may be positioned within LP-EGR passage 149 to provide an indication of one or more of a pressure, temperature, and air-fuel ratio of exhaust gas recirculated through the LP-EGR passage. When included, the HP-EGR system may route HP-EGR through a dedicated HP-EGR passage (not shown) from upstream of turbine 176 to downstream of compressor 174 (and upstream of intake throttle 20), via an HP-EGR cooler. The amount of HP-EGR provided to intake manifold 144 may be varied by controller 12 via an HP-EGR valve (not shown).

Each cylinder of engine 10 may include a spark plug 192 for initiating combustion. Ignition system 192 can provide an ignition spark to combustion chamber 30 via spark plug 192 in response to spark advance signal SA from controller 12, under select operating modes. In particular, in response to the spark signal from the controller, ignition system 192 may apply a high-voltage bias across spark plug 192 to enable ionization sensing. The high-voltage bias may be applied across the spark gap and may be applied prior to ignition coil dwell.

In some embodiments, each cylinder of engine 10 may be configured with one or more fuel injectors for providing fuel thereto. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. It will be appreciated that, in an alternate embodiment, injector 166 may be a port injector providing fuel into the intake port upstream of cylinder 30.

It will be appreciated that in still further embodiments, the engine may be operated by injecting a variable fuel blend or knock/pre-ignition suppressing fluid via two injectors (a direct injector 166 and a port injector) and varying a relative amount of injection from each injector.

Fuel may be delivered to fuel injector 166 via a high pressure fuel system 80, including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12.

Fuel may be delivered by the injector(s) to the cylinder during a single engine cycle of the cylinder. Further, the distribution and/or relative amount of fuel delivered from the injector(s) may vary with operating conditions. For example, the distribution may vary with a rate of change of a cylinder aircharge, a nature of an abnormal cylinder combustion event (such as, whether there is a cylinder misfire event, knock event, or pre-ignition event). Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel tanks in fuel system 80 may hold fuel or knock/pre-ignition suppressing fluids with different qualities, such as different compositions. These differences may include different alcohol content, different water content, different octane, different heat of vaporizations, different fuel blends, and/or combinations thereof etc. In one example, fuels or knock/pre-ignition suppressing fluids with different alcohol contents could include one fuel being gasoline and the other being ethanol or methanol. In another example, the engine may use gasoline as a first substance and an alcohol containing fuel blend such as E10 (which is approximately 10% ethanol and 90% gasoline) or E100 (which is approximately 100% ethanol) as a second substance. Other alcohol containing fuels could be a mixture of alcohol and water, a mixture of alcohol, water, and gasoline etc. In yet another example, one of the fluids may include water while the other fluid is gasoline or an alcohol blend. Additionally, the first and second fuels may also differ in other fuel qualities such as a difference in temperature, viscosity, octane number, latent enthalpy of vaporization etc. The fuel alcohol level may be estimated based on input from an alcohol level sensor coupled to the fuel system 80.

Alcohol and alcohol-based fuel blends may have higher boiling points and as such may not evaporate effectively during engine cranking at cold-start conditions. Incomplete vaporization of such alcohol and alcohol-based fuel blends may reduce fuel economy and degrade emissions. In addition, the reduced fuel vaporization may compromise combustion stability and cause misfires during engine starts. As elaborated herein, an engine controller may improve fuel vaporization and engine startability with alcohol fuels by reducing a cranking speed and adjusting a fuel and spark schedule for a defined number of engine cycles since a first engine cycle since an engine start.

In one example, during a first engine cold-start of an alcohol-fueled engine, the engine may be cranked via a starter motor 190 at a cranking speed that is decreased relative to a nominal cranking speed with spark enabled and cylinder fueling enabled during an intake stroke. During the first cold-start, fuel injection may be initiated after bottom dead center (BDC) of the intake stroke of an engine cycle and after intake valve closing and terminated at bottom dead center (BDC) of the intake stroke. By cranking the engine at a lower cranking speed, the time available for fuel vaporization (vaporization time) during which the air charge temperature is higher than the boiling point of the fuel is prolonged.

In another example, during a second engine cold-start of the alcohol-fueled engine, the engine may be cranked via the starter motor 190 at the decreased cranking speed with spark enabled and cylinder fueling extended from the intake stroke into the compression stroke. In yet another example, during a third engine cold-start of the alcohol-fueled engine, the engine may be cranked via the starter motor 190 at the decreased cranking speed with spark disabled and injected fuel compressed and expanded for a number of engine cycles, and then after the completion of the number of engine cycles, spark may be initiated. During each of the second and third cold-start, fuel injection may be started after BDC of the intake stroke and ended at TDC of the compression stroke. By extending fueling into the compression stroke, a higher volume of fuel may be injected and vaporized before spark is initiated. The number of engine cycles over which spark is disabled may be based on the alcohol content of the injected fuel and air charge temperature. The number of engine cycles may be increased as the alcohol content increases and the air charge temperature decreases. This allows more alcohol fuel to vaporize during cold conditions. The number of engine cycles may be decreased as the alcohol content decreases and the air charge temperature increases. Once the engine reaches the idling speed the starter motor 190 operation may be discontinued.

During the first, second, and third cold-starts, there may be a difference in the alcohol content of the fuel injected and/or the air charge temperature. As such, an alcohol content of fuel injected during the third cold-start may be higher than the alcohol content of fuel injected during the second cold-start, and the alcohol content of fuel injected during the second cold-start may be lower than the alcohol content of fuel injected during the first cold-start. Similarly, an air charge temperature during the third cold-start may be lower than the air charge temperature during the second cold-start, and the air charge temperature during the second cold-start may be lower than the air charge temperature during the first cold-start. Due to the higher alcohol content of fuel injected and/or lower air charge temperature during the third cold-start, in addition to lowering the cranking speed and extending the fueling (increasing fueling amount), spark may be disabled for the number of engine cycles to facilitate increased fuel vaporization (before combustion) and combustion stability. Details of the method of adjusting engine cranking speed, fueling, and initiation of spark during cold-start conditions are discussed in relation to FIG. 2.

Engine 10 may further include one or more knock sensors, accelerometers, vibrations sensors, or in-cylinder pressure sensors to sense engine block vibrations, such as those related to knock or pre-ignition. Further, the accelerometers, vibrations sensors, in-cylinder pressure sensors, and a crankshaft acceleration sensor 120 may be used to indicate a cylinder misfire event, such as a cylinder misfire event triggered by incomplete fuel vaporization before spark.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, manifold charge temperature (MCT) from temperature sensor 145; cylinder AFR from EGO sensor 128, abnormal combustion from a knock sensor and a crankshaft acceleration sensor; and fuel alcohol level from an alcohol level sensor coupled to the fuel system. Engine speed signal, RPM, may be generated by controller 12 from signal PIP. Manifold pressure signal MAP from a manifold pressure sensor may be used to provide an indication of vacuum, or pressure, in the intake manifold. Still other sensors such as cylinder pressure sensors, knock sensors, and/or pre-ignition sensors may be coupled to engine 10 (e.g., to a body of the engine) to help in the identification of abnormal combustion events. The controller 12 receives signals from the various sensors of FIG. 1 and employs the various actuators of FIG. 1 to adjust engine operation based on the received signals an instructions stored on a memory of the controller. In one example, during an engine start, based on input from one or more of engine coolant temperature sensor and a manifold charge temperature 145, the controller 12 may infer a cold-start condition and actuate the starter motor 190 to crank the engine at a lower than nominal speed. During the cold-start condition, the controller 12 may also send a signal to the ignitions system 192 and to the fuel system 80 to suspend spark until the completion of a number of engine cycles while maintaining fueling. Storage medium read-only memory 110 can be programmed with computer readable data representing instructions executable by processor 106 for performing the methods described below as well as other variants that are anticipated but not specifically listed.

In this way, the system of FIG. 1 provides for a vehicle system comprising: a starter motor; an engine including an intake manifold, a plurality of cylinders, and an exhaust manifold; an exhaust temperature sensor coupled to the exhaust manifold; an air charge temperature sensor coupled to the intake manifold; a crankshaft position sensor coupled to a crankshaft; a fuel system including one or more fuel injectors coupled to the plurality of cylinders; an ignition system including one or more spark plugs coupled to the plurality of cylinders; and a controller with computer readable instructions stored on non-transitory memory for: in response to an engine cold-start condition, actuating the starter motor to crank the engine at a lower than nominal cranking speed, actuating the fuel injectors to inject fuel from after a bottom dead center (BDC) of an intake stroke to TDC of a compression stroke, and deactivating spark for a number of number of engine cycles after engine start; and after completion of the number of engine cycles, actuating the starter motor to crank the engine at the nominal cranking speed, maintaining fueling from TDC of the intake stroke to TDC of the compression stroke, actuating the park plug to initiate spark at TDC of the compression stroke until engine idling speed is reached.

Figure 2:
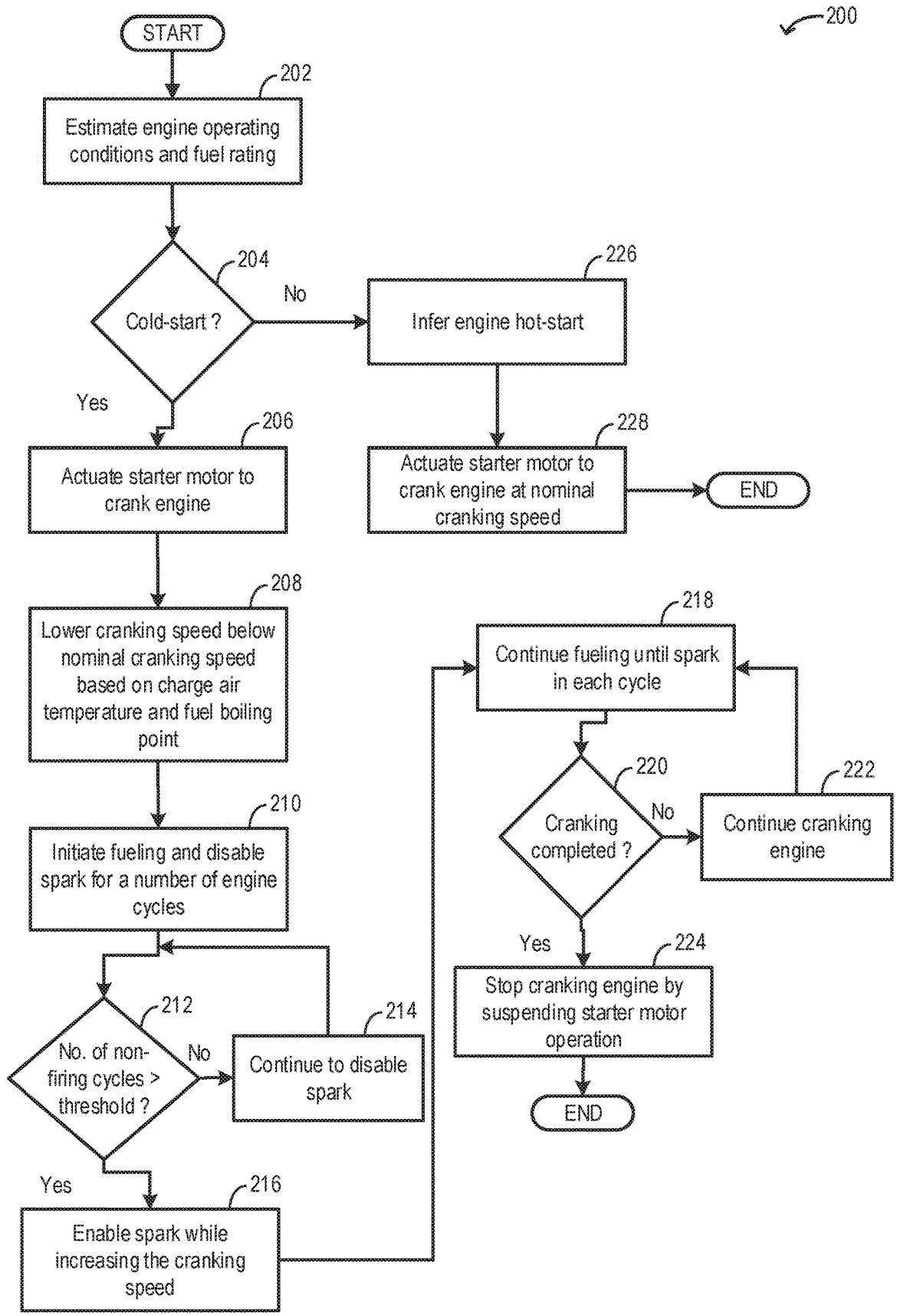
FIG. 2 shows a flow chart illustrating an example method that may be implemented for increasing fuel vaporization during cold-start conditions.

FIG. 2 illustrates an example method 200 that may be implemented for increasing fuel vaporization during engine start under cold-start conditions. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the routine includes estimating and/or measuring engine operating conditions. Conditions assessed may include, for example, driver demand, engine temperature, engine load, engine speed, exhaust temperature, air charge temperature, ambient conditions including ambient temperature, pressure, and humidity, manifold pressure and temperature, boost pressure, exhaust air/fuel ratio, etc. Also, the controller may determine the fuel octane or alcohol rating of the fuel to be injected into the cylinders as the engine is cranked. As an example, an alcohol fuel blend may be used and the alcohol (e.g. ethanol) content of the fuel may be determined since the percentage of alcohol in the fuel blend determines the boiling point of the fuel. As examples, E10 (10% Ethanol, 90% gasoline), E85 (85% Ethanol, 15% gasoline), E100 (100% Ethanol) may be used as fuel blends. Alternatively, pure gasoline (without any added alcohol) may be used in the vehicle fuel system. The boiling point of the fuel may be determined as a function of the alcohol content of the fuel. As gasoline and alcohol-based fuel blends are less volatile than diesel, the entire volume of the injected fuel may not be vaporized during engine cranking at nominal speed during cold-start conditions. Fuel boiling point may be further based on the octane content of the fuel. In one example, the fuel boiling point may be raised relative the boiling point of a fuel having a nominal octane rating (e.g., based on a gasoline fuel with no alcohol added) as the fuel octane content or alcohol content increases. All or part of the fuel may vaporize when the air charge temperature (or in-cylinder temperature) increases above the fuel boiling point. The fuel may vaporize within the vaporization time window before spark when in-cylinder (air charge) temperature is higher than the boiling point of the fuel.

At 204, the routine includes confirming an engine cold-start condition. An engine cold-start condition may be confirmed when the engine is started after a prolonged period of engine inactivity while the engine temperature is lower than a threshold (such as below an exhaust catalyst light-off temperature), and while ambient temperatures are below a threshold.

If engine cold-start conditions are confirmed, at 206, the controller may send a signal to an actuator coupled to the starter motor (such as starter motor 190 in FIG. 1) to crank the engine using energy from the starter motor. At 208, the cranking speed of the engine on the first engine cycle since the engine start, and for a number of cycles thereafter, may be lowered to below the nominal cranking speed of the engine. In one example, the nominal cranking speed may be 250 rpm and the lowered cranking speed used during cold-start conditions may be 150 rpm. Due to the lower cranking speed, the time between the piston position corresponding to the bottom dead center (BDC) and the top dead center (TDC) of the compression stroke may increase. Therefore, the vaporization time when the air charge temperature is higher than the fuel boiling point may increase, thereby increasing the time window available for the fuel to vaporize before the time to spark at TDC (at the end of compression stroke). Due to the longer vaporization time window, there may be an increase in the degree of fuel vaporization before spark. The degree of lowering of the cranking speed relative to the nominal speed may be adjusted based on each of the air charge temperature and the fuel boiling point or fuel alcohol content. The fuel boiling point may be proportional to the fuel alcohol content, the boiling point increasing as the alcohol content increases. In one example, the degree of lowering of the cranking speed may be decreased (cranking speed moved closer to the nominal speed) as one or both of air charge temperature increases and fuel alcohol content decreases. In another example, the degree of lowering may be increased (cranking speed moved further below the nominal speed) as one or both of air charge temperature decreases and fuel alcohol content increases. The degree of lowering of the cranking speed based on the fuel alcohol content may occur at a different rate than the degree of lowering of the cranking speed based on the air charge temperature. In one example, the cranking speed may be decreased by a larger amount responsive to a rise in the fuel alcohol content as compared to a drop in the air charge temperature.

For example, the controller may determine a control signal to send to the starter motor actuator, such as a signal corresponding to a desired starter motor speed, the signal determined based on each of the air charge temperature and fuel alcohol content. The controller may determine the cranking speed through a determination that directly takes into account each of a determined air charge temperature and a fuel alcohol content. The controller may alternatively determine the cranking speed based on a calculation using a look-up table with the input being each of the air charge temperature and the fuel alcohol content and the output being desired cranking speed (starter motor speed) or desired drop in cranking speed relative to a default/nominal cranking speed. As another example, the controller may make a logical determination (e.g., regarding the cranking speed) based on logic rules that are a first function of air charge temperature and a second, different function of fuel alcohol content. The controller may then generate a control signal that is sent to the starter motor actuator.

At 210, as the engine is being cranked at the lower than nominal speed, fueling may be initiated. During the engine cold-start, while the engine is being cranked, an engine controller may be configured to adjust an injection profile of fuel delivered to the cylinder. During engine cranking at the nominal speed, the end of injection timing may be at the bottom dead center (BDC) of the intake stroke. As the cranking speed is lowered from the nominal speed and an equal amount of fuel is injected at an equal rate (as injected during cranking at nominal speed), there may be a time gap between the end of injection timing and the BDC of intake stroke. Fueling may be continued during this time gap and also during the compression stroke. As such, the end of fuel injection timing may be adjusted to coincide with spark at the top dead center (TDC) of compression stroke. As such, fueling may be initiated after bottom dead center (BDC) of the intake stroke of an engine cycle and after intake valve closing such that heating of the intake charge has started due to compression and terminated at TDC of the compression stroke.

By continuing to inject fuel up to the TDC of compression stroke, a larger amount of fuel may be injected and vaporized. Spark may be disabled for a number of engine cycles while fueling is continued. By initiating spark after a number of engine cranking cycles, an amount of pre-vaporized fuel may be available for combustion thereby improving combustion stability. Also, as the fuel is compressed and expanded over the engine strokes without spark, a higher amount of fuel may vaporize and the cylinder walls may be heated. The heat generated during the cylinder compression stroke may directly heat the cylinder walls, thereby improving stability of upcoming combustion events and emissions quality. During the expansion stroke of the non-firing cycles, the vaporized fuel may be drawn into the cylinder, thereby reducing the possibility of increased tail-pipe emissions caused by un-combusted fuel vapors.

At 212, the routine includes determining if the number of engine cycles that were fueled but not fired since the engine start (including a first engine cycle since the engine start) is above a threshold number. The threshold number of non-firing engine cycles may be selected based on each of the alcohol content of the injected fuel and the air charge temperature so as to enable a larger portion of the fuel to be vaporized by the time spark is enabled. As an example, the threshold number of non-firing cycles may be increased as at least one of the alcohol content of the fuel increases and the air charge temperature decreases and the threshold number of non-firing cycles may be decreased as at least one of the alcohol content of the fuel decreases and the air charge temperature increases. As such, the number of cycles (when spark is disabled and fueling enabled) based on the fuel alcohol content may be different from the number of non-firing cycles based on the air charge temperature. In one example, the number of non-firing cycles may be increased by a responsive to a rise in the fuel alcohol content as compared to a drop in the air charge temperature.

For example, the controller may determine a control signal to send to the spark plug, such as a signal corresponding to a desired time to resume spark, the signal determined based on each of the air charge temperature and fuel alcohol content. The controller may determine the time of spark enablement through a determination that directly takes into account each of a determined air charge temperature and a fuel alcohol content. The controller may alternatively determine the time of spark enablement based on a calculation using a look-up table with the input being each of the air charge temperature and the fuel alcohol content and the output being the desired time for resuming spark. As another example, the controller may make a logical determination (e.g., regarding resuming spark) based on logic rules that are a first function of air charge temperature and a second, different function of fuel alcohol content. The controller may then generate a control signal that is sent to the spark plug actuator.

If it is determined that the number of non-firing cycles completed is lower than the threshold number, at 214 cranking may be continued at the lower speed while continuing fueling (with fueling extended into the compression stroke) and with spark maintained disabled.

If it is determined that a threshold number of non-firing cycles has been completed since a first engine cycle of the engine start, at 216, spark may be enabled. For example, spark may be resumed at TDC of the compression stroke. In one example, after completion of the number of engine cycles, the engine may be cranked via the starter motor at a higher cranking speed with fuel injection enabled and spark enabled. The higher cranking speed may be equal to or lower than the nominal cranking speed that may be used for engine start during hot-start conditions. By raising the cranking speed after the number of engine cycles have been completed, the intake manifold pressure may be lowered and cylinder combustion can be performed with a higher degree of fuel vaporized before spark is initiated. In another example, after completion of the number of engine cycles, the engine may continue to be cranked via the starter motor at the lower than nominal cranking speed with fuel injection enabled and spark enabled.

At 218, fuel injection timing may be adjusted to continue until spark timing. For example, an end of fuel injection timing may be shifted from bottom dead center (BDC) of the intake stroke to top dead center (TDC) of compression stroke. In this way, a higher amount of fuel may be injected to the cylinder before spark, thereby allowing for an increase in fuel vaporization. After increasing the cranking speed and initiating spark, for at least a first engine cycle after resuming spark, a fuel pulse-width may be adjusted based on the average vaporization time of fuel (which governs the amount of fuel vaporized) during the previous number of non-firing engine cycles. In one example, the fuel pulse-width may be decreased on the first cycle where spark is resumed as the amount of fuel vaporized during the previous number of engine cycles increases. As such, if there is a higher amount of pre-vaporized fuel available when spark is initiated, future fueling schedule may be adjusted to decrease the total amount of fuel injected during subsequent injection events. As an example, the vaporization time may be estimated based on engine speed and fuel alcohol content, and the start of injection and fuel pulse-width may be adjusted based on the vaporization time such that an optimal amount of fuel is vaporized for combustion.

As such, the engine cranking at the reduced cranking speed with engine fueling for the number of engine cycles with spark disabled is used to improve alcohol fuel vaporization, which reduces the occurrence of misfire events. However, if misfire does occur, the engine cranking may be further adjusted. Misfire events may be detected based on inputs from a crankshaft position (acceleration) sensor.

FIG. 6A shows a first statistical example 602 of first firing event combustion stability at a first cranking speed of 250 rpm. In this example, 26 simulated engine-starts at cold-start conditions using 250 rpm as cranking speed is shown. The x-axis shows a counter for the number of engine (first firing event) starts for a given cylinder. The y-axis shows an indicated mean effective pressure (IMEP) which represents an average cylinder pressure at each engine start. Lower than threshold IMEP may result in combustion instability and engine misfires. A standard deviation of IMEP (IMEP_SD) was computed taking into account the IMEP during each of the 26 simulated engine-starts. IMEP_SD is an indicator of combustion stability and higher the value of the standard deviation, the higher is the possibility of engine misfires. In this example, the IMEP_SD is 1.24 indicating a higher possibility of a misfire event.

FIG. 6B shows a second statistical example 604 of first firing event combustion stability at a second cranking speed of 200 rpm. In this example, 26 simulated engine-starts at cold-start conditions using 200 rpm as cranking speed is shown. The x-axis shows a counter for the number of engine starts (first firing event) for a given cylinder and the y-axis shows an indicated mean effective pressure (IMEP) at each engine start. In this example, the indicator of combustion stability, IMEP_SD is 0.77. Compared to the example 602, the lower IMEP_SD in example 604 shows that operating engine at a lower cranking speed during cold-start improves combustion stability and decreases the possibility of a misfire event.

FIG. 6C shows a second statistical example 606 of first firing event combustion stability at a third cranking speed of 150 rpm. Similar to examples 602 and 604, in this example, 26 simulated engine-starts at cold-start conditions using 150 rpm as cranking speed is shown. The x-axis shows a counter for the number of engine starts (first firing event) for a given cylinder and the y-axis shows an indicated mean effective pressure (IMEP) at each engine start. In this example 606, the indicator of combustion stability, IMEP_SD is 0.43 indicating a lower possibility of a misfire event compared to the IMEP_SD values as seen in examples 602 and 604. In this way, by operating the engine at a lower cranking speed during cold-start conditions, combustion stability may be increased and possibility of occurrence of misfire events may be lowered. The improvement in combustion stability at lower cranking speeds may be due to a longer time window for fuel vaporization before combustion. Also, by reducing the possibility of occurrence of misfire events during cold-start conditions, unburned hydrocarbon emissions (UHC) relative to engine start at higher cranking speed may be reduced. In one example, for a given fuel alcohol content and air charge temperature, during a cold-start condition, the controller may crank the engine via the starter motor at a cranking speed that is decreased relative to the nominal cranking speed with spark enabled and cylinder fueling enabled during an intake stroke. However, if the engine encounters misfiring events caused due to incomplete vaporization of fuel, in subsequent engine starts with substantially similar fuel alcohol content and air charge temperature, such as subsequent engine starts on the same drive cycle, the controller may crank the engine via the starter motor at a cranking speed that is decreased relative to the nominal cranking speed with spark enabled and cylinder fueling extended from the intake stroke into a compression stroke. If the combustion stability does not improve and misfire events still continue to occur, for subsequent engine starts with substantially similar fuel alcohol content and air charge temperature, in addition to cranking the engine at a lower speed and continuing fueling into the compression stroke, the controller may also disable spark for a number of engine cycles to increase fuel vaporization before the first combustion event, thereby increasing combustion stability.

At 220, the routine includes determining if engine cranking is complete. As such, once the engine reaches the idle speed, cranking via the starter motor may no longer be required. If it is confirmed that the engine cranking is not completed, at 222, the starter motor may be continued to be operated and the engine may be cranked at a speed lower than or equal to the nominal cranking speed. Also, during each cycle, fuel injection may be continued till spark. If it is determined that the engine cranking via the starter motor is completed, combustion may drive the engine, and cranking may be stopped by suspending starter motor operation.

If at 204, it is confirmed that cold-start conditions are not present, at 226, it may be inferred that the engine is started under hot-start conditions. Under hot-start, the engine temperature may be higher than a threshold temperature and the air charge temperature may be higher than the boiling point of the injected fuel. Therefore, prolongation of vaporization time may not be desired during a hot-start. At 228, upon confirmation of an engine hot-start, the controller may send a signal to the starter motor to crank the engine at the nominal cranking speed. Also, fuel injection and spark may be enabled during engine cranking. Fuel may be injected into the cylinders starting from the TDC of the intake stroke to the BDC of the intake stroke, and spark may be enabled at TDC of the compression stroke.

In this way, during cold-starts, the engine may be cranked via the starter motor at a lower cranking speed with fuel injection enabled and spark disabled for a first number of engine cycles, and then spark may be enabled; and during a hot-start, the engine may be cranked via the starter motor at a higher cranking speed with fuel injection and spark enabled.

FIG. 3 shows an example plot 300 of change in air charge temperature and fuel boiling point with change in cranking speed. Spark may be set to occur at the top dead center (TDC) at the end of the compression stroke. In this example, the x-axis is the time (in microseconds) to TDC (time to spark) and the y-axis denotes temperature (in Kelvin). Plot 302 shows change in boiling point of a first fuel A over time when the engine cranking speed is 250 rpm. Plot 304 shows change in boiling point of the same fuel A over time when the engine cranking speed is 150 rpm. In the depicted example, 250 rpm may correspond to a nominal cranking speed and 150 rpm may be a lower than nominal cranking speed during engine cold-start conditions. The boiling point of the fuel may be directly proportional to the fuel alcohol content, the boiling point increasing as the fuel alcohol content increases. The alcohol content of the fuel may be estimated via a sensor coupled to the fuel system. In one example, fuel A may be E10, E85, E100, etc. Plot 306 shows air charge temperature during engine cranking at 250 rpm and plot 308 shows air charge temperature during engine cranking at 150 rpm. Air charge temperature may be estimated based on inputs from a manifold air temperature sensor.

During cold-start conditions, air charge temperature may be lower than fuel boiling point temperature. During the compression stroke, the cylinder pressure increases and there is a corresponding increase in fuel boiling point and air charge temperature. When engine is being cranked at 150 rpm, prior to time T1, the fuel boiling point is higher than the air charge temperature. Point T1 corresponds to a time to TDC at which the air charge temperature increases to be equal to the boiling point of the fuel A. In the vaporization time window W1, between T1 and the time to spark at BDC, the fuel boiling point continues to be higher than the air charge temperature. Similarly, when the engine is being cranked at 250 rpm, point T2 corresponds to a time (to TDC) at which the air charge temperature increases to be equal to the boiling point of the fuel A. In the vaporization time window W2 between T1 and the time to spark at BDC, the fuel boiling point continues to be higher than the air charge temperature. Fuel may vaporize in the time windows W1 and W2 during operation of the engine at 150 rpm and 250 rom respectively. As seen from this example, since W1 is a longer time window compared to W2, an increased amount of fuel may vaporize (prior to spark) during engine operation at a lower 150 rpm relative to engine operation at 250 rpm. Due to the higher amount of vaporized fuel, combustion stability may be improved at lower cranking speeds.

FIG. 4 shows a map 400 of piston positions with respect to an engine position, for a given engine cylinder, during engine cranking. The first example plot 402 shows piston positions with respect to an engine position when gasoline is used as fuel during engine cranking at hot-start conditions. The second example plot 404 shows piston positions with respect to an engine position when gasoline is used as fuel during engine cranking at cold-start conditions. The third example plot 406 shows piston positions with respect to an engine position when E10 (10% Ethanol, 90% gasoline) is used as fuel during engine cranking at cold-start conditions. The fourth example plot 408 shows piston positions with respect to an engine position when E100 (100% Ethanol) is used as fuel during engine cranking at cold-start conditions.

Map 400 illustrates an engine position along the x-axis in crank angle degrees (CAD). Curves 403 (of plot 402), 405 (of plot 404), 407 (of plot 406), and 409 (of plot 408) depict piston positions (along the y-axis), with reference to their location from top dead center (TDC) and/or bottom dead center (BDC), and further with reference to their location within the four strokes (intake, compression, power and exhaust) of an engine cycle. As indicated by sinusoidal curves 403, 405, 407, and 409, a piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke.

During hot-start conditions, the engine may be cranked at a nominal speed. The curve 403 of the first example plot 402 shows the piston positions during engine operation at this nominal cranking speed. Fuel injection may be carried out in the time window F1 between TDC and BDC of the intake stroke. Spark timing may be adjusted to correspond to the TDC at the end of the compression stroke. Due to the hot-start condition, the air charge temperature may be higher than the boiling point of the fuel and an expected amount of fuel may vaporize before spark. The boiling point of the fuel is based on the fuel ethanol content, the higher the percentage of alcohol, the higher is the boiling point. In the example plot 402, gasoline is used as fuel and the boiling point of gasoline (without any ethanol additive) is higher than that of the fuel blends comprising ethanol.

During cold-start conditions, the air charge temperature may be lower than the fuel boiling point until the compression stroke. The time window available for fuel vaporization (time period before spark when air charge temperature is higher than fuel boiling point) may be smaller resulting in incomplete vaporization of fuel which may result in combustion instability. In order to increase the amount of fuel vaporization, the cranking speed may be lowered such that the duration of the compression stroke increases and the vaporization time window increases. The degree of cranking speed lowering may be based on the ethanol content of the fuel. Also, during cold-start conditions, in order to increase the total amount of fuel injected, fuel injection may be extended from the intake stroke into the compression stroke (from TDC of intake stroke to TDC of compression stroke). In other words, fueling may be initiated in the intake stroke and continued until spark at TDC of compression stroke. The pulse-width of the fueling schedule may be maintained at the same level as used during engine cranking under hot-start conditions. In this way, by continuing fueling at a constant rate until spark, a higher volume of fuel may be available for combustion.

In the example plot 404, the curve 405 shows the piston positions during engine cranking at cold-start conditions. Due to the cold-start condition, the cranking speed may be reduced relative to the nominal speed. In this example plot 404, gasoline is used as the fuel and fueling may be carried out in the time window F2, between the TDC of the intake stroke and the TDC of the compression stroke. The time window F2 is longer than the time window F1. Therefore, by maintaining the same fueling pulse width during both conditions, a higher volume of fuel may be injected before spark in the second example 404 compared to the first example 402. By increasing the amount of fuel injected and my extending the time window for vaporization, a higher volume of vaporized fuel may be available for combustion.

In the example plot 406, the curve 407 shows the piston positions during engine cranking at cold-start conditions when E10 is used as fuel. Due to the higher ethanol content of E10 blend, the boiling point of the fuel may be higher than gasoline. Therefore to further increase the time window for fuel vaporization before spark, the cranking speed may be further reduced relative to the nominal speed. Fueling may be carried out in the time window F3, between the TDC of the intake stroke and the TDC of the compression stroke. The time window F3 is longer than each of the time windows F1 and F2. Therefore, by maintaining the same fueling pulse width, a higher volume of fuel may be injected before spark in the third example 406 compared to the first and second examples 402 and 404, respectively. An optimal level of E10 may vaporize in the extended time window created due to the lower cranking speed.

In the example plot 408, the curve 409 shows the piston positions during engine cranking at cold-start conditions when E100 is used as fuel. Since this fuel is completely comprised of ethanol, its boiling point may be substantially higher than that of gasoline and E10. Therefore to further increase the time window for fuel vaporization before spark, the cranking speed may be further reduced relative to the cranking speed used for gasoline and E10 during cold-start. Fueling may be carried out in the time window F4, between the TDC of the intake stroke and the TDC of the compression stroke. The time window F4 is longer than each of the time windows FI, F2, and F3. Therefore, by maintaining the same fueling pulse width, a higher volume of fuel may be injected before spark in the fourth example 406 compared to the previous examples (plots 402, 404, and 406). The increased time window due to the lower cranking speed ensures an optimal level of vaporization of the E100 fuel. In this way, during cold-start conditions, based on the ethanol content of the fuel, the cranking speed of the engine may be adjusted and fueling may be extended until spark to facilitate an optimal amount of fuel vaporization for stable combustion.

FIG. 5 shows an example engine start with adjusted cranking speed. Map 500 depicts injection timing, spark timing, and cranking speed during engine cranking. The first plot, line 502, shows engine cranking speed during an engine hot-start when gasoline is used as fuel. The second plot, line 504, shows engine cranking speed during an engine cold-start when gasoline is used as fuel. The third plot, line 506, shows engine cranking speed during an engine cold-start when E10 fuel blend (10% ethanol and 90% gasoline) is used. The fourth plot, line 508, shows engine cranking speed during an engine cold-start when E100 fuel (100% ethanol) is used. The x-axis denotes the engine cycle (number) after engine start. In this example, four engine cycles are shown, each cycle comprising an intake, a compression, a power, and an exhaust stroke.

During a hot-start condition (as shown by the first plot), the controller may send a signal to an actuator coupled to the starter motor to crank the engine at a nominal cranking speed S1. In the first plot, gasoline is used as fuel and L1 denotes an amount of gasoline injected during each engine cycle. In this plot, four engine cycles are shown, and in each cycle an equal amount of fuel may be injected during the intake stroke. Spark may be initiated at the end of the compression stroke of each engine cycle, as denoted by S. The engine speed may be maintained at the nominal speed during each engine cycle. The lack of an "S" label means that there is no spark event for that cycle.

During a cold-start condition, the controller may send a signal to an actuator coupled to the starter motor to crank the engine at a lower than nominal cranking speed S2. In the second plot, gasoline is used as fuel and L2 denotes an amount of gasoline injected during each engine cycle as engine is cranked at cold-start. Due to the lower cranking speed, there is an increase in the time window available for fuel vaporization. In this plot, four engine cycles are shown, and in each cycle an equal amount of fuel may be injected during each of the intake stroke and the compression stroke. By injecting fuel during both the intake stroke and the compression stroke and by lowering the cranking speed, a higher volume of fuel may be injected and an increased amount of fuel may be vaporized. As such, fuel may be injected after bottom dead center (BDC) of the intake stroke of an engine cycle and after intake valve closing such that heating of the intake charge has started due to compression, to top dead center of a compression stroke of each engine cycle.

As seen in this example, the amount of gasoline injected during cold-start, L2 is higher than the amount of gasoline injected during hot-start, L1. In order to increase the amount of vaporized fuel available for combustion, spark may be disabled for a number of engine cycles. The number of non-firing engine cycles (without spark) may be selected based on the alcohol content of the injected fuel and the ambient temperature so as to enable a larger portion of the fuel to be vaporized by the time spark is enabled. For gasoline as fuel (no ethanol), spark may be disabled for one engine cycle and at the end of the compression stroke of the second cycle, spark may be initiated. Also, the cranking speed may be increased to the nominal cranking speed S1 at the end of the second engine cycle. By raising the cranking speed after the number of engine cycles have elapsed, and resuming spark, the intake manifold pressure may be lowered and cylinder combustion can be performed with a higher degree of fuel vaporized before combustion is initiated.

In the third plot, E10 (10% ethanol and 90% gasoline) is used as fuel which has a higher boiling point than gasoline. Therefore the amount of fuel injected and the vaporization time window before spark may be increased to facilitate vaporization of an optimal amount of fuel. L3 denotes an amount of E10 injected during both the intake and compression strokes of each engine cycle as engine is cranked at cold-start. The cranking speed may be further decreased to speed S3 (S3 lower than each of S2 and S1) to increase the time window available for fuel vaporization. As seen in this example, the amount of E10 injected during cold-start, L3 is higher than the amount of gasoline injected during cold-start, L2. In order to increase the amount of vaporized E10 fuel available for combustion, spark may be disabled for two engine cycles and at the end of the compression stroke of the third cycle, spark may be initiated. The cranking speed may be increased to the nominal cranking speed S1 at the end of the third engine cycle to lower the intake manifold pressure.

In the fourth plot, E100 (100% ethanol) is used as fuel which has a higher boiling point than E10. Therefore the amount of fuel injected and the vaporization time window before spark may be further increased to facilitate vaporization of an optimal amount of fuel. L4 denotes an amount of E100 injected during both the intake and compression strokes of each engine cycle as engine is cranked at cold-start. The cranking speed may be further decreased to speed S4 (S4 lower than S3) to increase the vaporization time window. In order to further increase the amount of vaporized E100 fuel available for combustion, spark may be disabled for three engine cycles and at the end of the compression stroke of the fourth cycle, spark may be initiated. The cranking speed may be increased to the nominal cranking speed S1 at the end of the third engine cycle to lower the intake manifold pressure. In this way, by adjusting cranking speed and fueling amount based on ethanol content in fuel, and by operating the engine without spark for a number of cycles, a higher amount of fuel may be vaporized for optimal engine performance at cold-start conditions.

In this way, by lowering cranking speed to below the nominal speed while maintaining spark deactivated for a number of engine cycles, a larger time window is provided for fuel vaporization. By increasing the vaporization time window, a higher amount of fuel may be vaporized before spark is initiated, thereby increasing combustion stability and reducing feed gas hydrocarbon emissions. By increasing the cranking speed after the number of engine cycles have elapsed, intake manifold pressure may be increased, thereby further improving combustion stability. The technical effect of continuing fuel injection until spark during each engine cycle, a higher amount of fuel may be injected resulting in an increase in the amount of vaporized fuel available for combustion. By adjusting the cranking speed, fuel injection, and the number of non-firing cycles based on the ethanol content of the fuel, a desired amount of vaporized fuel may be available even for higher alcohol content fuels. Overall, by increasing the degree of fuel vaporization, engine performance, fuel economy and emissions quality may be increased.

An example engine method comprises: for a number of engine cycles since a first engine cycle of an engine cold-start, cranking the engine via a starter motor with cranking speed decreased relative to a nominal cranking speed while injecting fuel and disabling spark; and after the number of engine cycles with injected fuel compressed and expanded, increasing the cranking speed to the nominal cranking speed and initiating spark. In any preceding example further, additionally or optionally, the number of engine cycles is based on an alcohol content of injected fuel, the number of engine cycles increased as the alcohol content of the injected fuel increases. In any or all of the preceding examples, additionally or optionally, the number of engine cycles is further based on an air charge temperature at a time of engine start, the number of engine cycles increased as the air charge temperature decreases. In any or all of the preceding examples, additionally or optionally, the decreased cranking speed is based on an alcohol content of injected fuel, the cranking speed decreased further relative to the nominal speed as the alcohol content of the injected fuel increases. Any or all of the preceding examples further comprises, additionally or optionally, for the number of engine cycles, initiating fueling after bottom dead center (BDC) of the intake stroke of an engine cycle and after intake valve closing and terminating fueling at TDC of compression stroke of the engine cycle. Any or all of the preceding examples further comprises, additionally or optionally, after increasing the cranking speed and initiating spark, adjusting a fuel pulse-width based on an amount of fuel vaporized during the number of engine cycles. In any or all of the preceding examples, additionally or optionally, the fuel pulse-width is decreased as the amount of fuel vaporized during the number of engine cycles increases. In any or all of the preceding examples, additionally or optionally, injecting fuel includes extending an end of injection timing, the end of injection timing extended towards a top dead center of compression stroke as the cranking speed is decreased.

Another example method comprises: during a first engine start, cranking the engine via a starter motor at a lower cranking speed with fuel injection enabled and spark disabled for a first number of engine cycles, and then resuming spark; and during a second engine start, cranking the engine via the starter motor at a higher cranking speed with fuel injection and spark enabled. In any of the preceding examples, additionally or optionally, the first engine start is a cold-start and the second engine start is a hot-start. In any or all of the preceding examples, additionally or optionally, an alcohol content of fuel injected during the first engine start is higher than the alcohol content of fuel injected during the second engine start. In any or all of the preceding examples, additionally or optionally, the first number of engine cycles is based on the alcohol content of the injected fuel, the first number of engine cycles increased as the alcohol content increases. In any or all of the preceding examples, additionally or optionally, the first number of engine cycles is further based on charge air temperature at the first engine start, the first number of engine cycles increased as the charge air temperature decreases. Any or all of the preceding examples further comprises, additionally or optionally, during the first engine start, after completion of the first number of engine cycles, cranking the engine via the starter motor at the higher cranking speed with fuel injection enabled and spark enabled, and discontinuing starter motor operation when engine idling speed is reached. Any or all of the preceding examples further comprises, additionally or optionally, during the first engine start, after completion of the first number of engine cycles, cranking the engine via the starter motor at the lower cranking speed with fuel injection enabled and spark enabled, and discontinuing starter motor operation when engine idling speed is reached. In any or all of the preceding examples, additionally or optionally, during the first engine start, fuel is injected after bottom dead center (BDC) of the intake stroke of an engine cycle and after intake valve closing to the top dead center of a compression stroke of each engine cycle for the first number of engine cycles, and wherein during the second engine start, fuel is injected from top dead center of an intake stroke to the bottom dead center of the intake stroke of each engine cycle.

Yet another example method comprises: during a first engine cold-start of an alcohol-fueled engine, cranking the engine via a starter motor at a cranking speed that is decreased relative to a nominal cranking speed with spark enabled and cylinder fueling during an intake stroke; during a second engine cold-start of the alcohol-fueled engine, cranking the engine via the starter motor at the decreased cranking speed with spark enabled and cylinder fueling extended from the intake stroke into a compression stroke; and during a third engine cold-start of the alcohol-fueled engine, cranking the engine via the starter motor at the decreased cranking speed with spark disabled and injected fuel compressed and expanded for a number of engine cycles, and then initiating spark. In any of the preceding examples, additionally or optionally, an alcohol content of fuel injected during the third cold-start is higher than the alcohol content of fuel injected during the second cold-start, and wherein the alcohol content of fuel injected during the second cold-start is higher than the alcohol content of fuel injected during the first cold-start. In any or all of the preceding examples, additionally or optionally, an air charge temperature during the third cold-start is lower than the air charge temperature during the second cold-start, and wherein the air charge temperature during the second cold-start is lower than the air charge temperature during the first cold-start. In any or all of the preceding examples, additionally or optionally, during the first cold-start, fuel injection is started at TDC of the intake stroke and ended at BDC of the intake stroke, and wherein during each of the second and third cold-start, fuel injection is started after bottom dead center (BDC) of the intake stroke of an engine cycle and after intake valve closing and ended at TDC of the compression stroke.

In a further representation, an engine system comprises: a starter motor; an engine including an intake manifold, a plurality of cylinders, and an exhaust manifold; an exhaust temperature sensor coupled to the exhaust manifold; an air charge temperature sensor coupled to the intake manifold; a crankshaft position sensor coupled to a crankshaft; a fuel system including one or more fuel injectors coupled to the plurality of cylinders; an ignition system including one or more spark plugs coupled to the plurality of cylinders; and a controller with computer readable instructions stored on non-transitory memory for: in response to an engine cold-start condition, actuating the starter motor to crank the engine at a lower than nominal cranking speed, actuating the fuel injectors to inject fuel from a top dead center (TDC) of an intake stroke to TDC of a compression stroke, and deactivating spark for a number of number of engine cycles after engine start; and after completion of the number of engine cycles, actuating the starter motor to crank the engine at the nominal cranking speed, maintaining fueling from TDC of the intake stroke to TDC of the compression stroke, actuating the spark plug to initiate spark at TDC of the compression stroke until engine idling speed is reached. In any preceding example, additionally or optionally, the lower than nominal cranking speed and the number of engine cycles is based on an alcohol content of the fuel, the cranking speed decreased with an increase in the alcohol content in the fuel, and the number of engine cycles increased with an increase in the alcohol content in the fuel. In any or all of the preceding examples, additionally or optionally, the controller includes further instructions for: in response to engine speed reaching the idling speed, deactivating the starter motor, and actuating the fuel injectors to inject fuel from TDC of the intake stroke to bottom dead center (BDC) of the intake stroke.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   estimating engine operating conditions, based on sensor data obtained via an electronic controller, including an engine temperature and an air charge temperature,
   for a number of engine cycles since a first engine cycle of an engine cold-start, cranking the engine via a starter motor, while injecting fuel and disabling spark, at a cranking speed lowered relative to a first cranking speed, each of a degree of lowering of the cranking speed relative to the first cranking speed and a starter motor speed is estimated based on the air charge temperature;
   determining the number of engine cycles completed since the first engine cycle via the electronic controller;
   after completion of the number of engine cycles with injected fuel compressed and expanded, cranking the engine, via the starter motor, with the cranking speed increased to the first cranking speed and initiating spark, the first cranking speed used to crank the engine during an engine hot-start; and
   in response to an engine speed increasing to an idling speed, suspending operation of the starter motor and driving the engine via combustion.

2. The method of claim 1, wherein the number of engine cycles is based on an alcohol content of injected fuel, as estimated based on the sensor data obtained via the electronic controller, the number of engine cycles increased as the alcohol content of the injected fuel increases, wherein each and every one of the number of cycles occurs without any spark event therein.

3. The method of claim 2, wherein the number of engine cycles is further based on the air charge temperature at a time of engine start, the number of engine cycles increased as the air charge temperature decreases.

4. The method of claim 1, wherein the decreased cranking speed is further based on an alcohol content of injected fuel, the cranking speed decreased further relative to the first cranking speed as the alcohol content of the injected fuel increases.

5. The method of claim 1, further comprising, for the number of engine cycles, initiating fueling after bottom dead center (BDC) of an intake stroke of an engine cycle and after intake valve closing, and terminating fueling at top dead center (TDC) of a compression stroke of the engine cycle.

6. The method of claim 1, further comprising, after increasing the cranking speed and initiating spark, estimating an amount of fuel vaporized based on sensor data obtained via the electronic controller and adjusting a fuel pulse-width based on the amount of fuel vaporized during the number of engine cycles.

7. The method of claim 6, wherein the fuel pulse-width decreases as the amount of fuel vaporized during the number of engine cycles increases.

8. The method of claim 1, wherein injecting fuel includes estimating an end of injection timing based on sensor data as obtained via the electronic controller and extending the end of injection timing, the end of injection timing extended towards a top dead center of a compression stroke as the cranking speed is decreased.

9. A method for an engine, comprising:
   estimating engine operating conditions based on sensor data obtained via an electronic controller,
   during a first engine start, cranking the engine via a starter motor at a second cranking speed with fuel injection enabled and spark disabled for a first number of engine cycles, and then resuming spark and cranking the engine via the starter motor at a first cranking speed; and
   during a second engine start, cranking the engine via the starter motor at the first cranking speed with fuel injection and spark enabled, the first cranking speed higher than the second cranking speed,
   wherein each of a degree of lowering of the second cranking speed relative to the first cranking speed and a starter motor speed is based on an estimated air charge temperature.

10. The method of claim 9, wherein the first engine start is a cold-start and the second engine start is a hot-start.

11. The method of claim 9, wherein an alcohol content of fuel injected during the first engine start is higher than the alcohol content of fuel injected during the second engine start.

12. The method of claim 11, wherein the first number of engine cycles is based on the alcohol content of the injected fuel, the first number increased as the alcohol content increases.

13. The method of claim 9, wherein the first number of engine cycles is further based on charge air temperature at the first engine start, the first number of engine cycles increased as the charge air temperature decreases.

14. The method of claim 9, further comprising, during the first engine start, after completion of the first number of engine cycles, cranking the engine via the starter motor at the first cranking speed with fuel injection enabled and spark enabled, and discontinuing starter motor operation when engine idling speed is reached.

15. The method of claim 9, further comprising, during the first engine start, after completion of the first number of engine cycles, cranking the engine via the starter motor at the second cranking speed with fuel injection enabled and spark enabled, and discontinuing starter motor operation when engine idling speed is reached.

16. The method of claim 9, wherein during the first engine start, fuel is injected after bottom dead center (BDC) of an intake stroke of an engine cycle and after intake valve closing, to top dead center (TDC) of a compression stroke of each engine cycle for the first number of engine cycles, and wherein during the second engine start, fuel is injected from TDC of the intake stroke to BDC of the intake stroke of each engine cycle.

17. A method for an engine, comprising:
   estimating engine operating conditions and air charge temperature based on sensor data obtained via an electronic controller,
   during a first engine cold-start of an alcohol-fueled engine, cranking the engine via a starter motor at a second cranking speed that is lower than a first cranking speed with spark enabled and cylinder fueling during an intake stroke for a number of engine cycles, and then cranking the engine, via the starter motor, at the first cranking speed;
   during a second engine cold-start of the alcohol-fueled engine, cranking the engine via the starter motor at the second cranking speed with spark enabled and cylinder fueling extended from the intake stroke into a compression stroke for the number of engine cycles, and then cranking the engine, via the starter motor, at the first cranking speed;
   during a third engine cold-start of the alcohol-fueled engine, cranking the engine via the starter motor at the second cranking speed with spark disabled and injected fuel compressed and expanded for the number of engine cycles, and then initiating spark and cranking the engine, via the starter motor, at the first cranking speed; and during an engine hot-start, cranking the engine via the starter motor at the first cranking speed with spark enabled and cylinder fueling during the intake stroke, wherein each of a degree of lowering of the second cranking speed relative to the first cranking speed and a starter motor speed is based on an estimated air charge temperature.

18. The method of claim 17, wherein an alcohol content of fuel injected during the third engine cold-start is higher than the alcohol content of fuel injected during the second engine cold-start, and wherein the alcohol content of fuel injected during the second engine cold-start is higher than the alcohol content of fuel injected during the first engine cold-start.

19. The method of claim 17, wherein the air charge temperature during the third engine cold-start is lower than the air charge temperature during the second engine cold-start, and wherein the air charge temperature during the second engine cold-start is lower than the air charge temperature during the first engine cold-start.

20. The method of claim 17, wherein during the first engine cold-start, fuel injection is started at TDC of the intake stroke and ended at BDC of the intake stroke, and wherein during each of the second and third engine cold-starts, fuel injection is started after BDC of the intake stroke of an engine cycle and after intake valve closing and ended at TDC of the compression stroke.

* * * * *